(12) United States Patent
Bichsel

(10) Patent No.: US 8,513,562 B2
(45) Date of Patent: Aug. 20, 2013

(54) METHOD AND SYSTEM FOR HYBRID DIRECT MANUFACTURING

(75) Inventor: Steve L. Bichsel, Arlington, TX (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 13/178,468

(22) Filed: Jul. 7, 2011

(65) Prior Publication Data

US 2013/0008879 A1    Jan. 10, 2013

(51) Int. Cl.
*B23K 26/00* (2006.01)
*B23K 26/20* (2006.01)
*B23K 15/00* (2006.01)

(52) U.S. Cl.
USPC ............ 219/121.13; 219/121.14; 219/121.63; 219/121.64

(58) Field of Classification Search
USPC ............. 219/121.13–121.15, 121.21, 121.31, 219/121.35, 121.63, 121.64, 121.82, 121.85; 250/307, 492.3
See application file for complete search history.

(56) References Cited

U.S. PATENT DOCUMENTS

| | | | |
|---|---|---|---|
| 2,981,823 A * | 4/1961 | Candidus | 219/121.13 |
| 4,117,302 A | 9/1978 | Earle et al. | |
| 4,323,756 A | 4/1982 | Brown et al. | |
| 5,211,776 A | 5/1993 | Weiman | |
| 5,620,552 A | 4/1997 | Denney | |
| 6,740,197 B2 * | 5/2004 | Sans | 156/580.2 |
| 6,814,823 B1 | 11/2004 | White | |
| 7,093,542 B2 * | 8/2006 | Gousman et al. | 102/493 |
| 7,380,698 B2 | 6/2008 | Meyer et al. | |
| 7,648,740 B2 | 1/2010 | Slaughter | |
| 2003/0049568 A1 | 3/2003 | Vogt | |
| 2005/0235862 A1 | 10/2005 | Gousman et al. | |
| 2007/0036964 A1 | 2/2007 | Rosenberger et al. | |
| 2007/0218657 A1 | 9/2007 | Bet et al. | |
| 2008/0118665 A1 | 5/2008 | Slaughter | |
| 2010/0135779 A1 * | 6/2010 | Stimper | 415/208.1 |
| 2010/0233508 A1 | 9/2010 | Schneegans et al. | |

FOREIGN PATENT DOCUMENTS

| | | |
|---|---|---|
| DE | 10051893 A1 | 6/2001 |
| DE | 10227233 A1 | 10/2003 |
| DE | 102008012064 A1 | 9/2009 |
| EP | 0529816 A1 * | 3/1993 |
| EP | 2189238 | 5/2010 |
| WO | WO 2006/133034 | 12/2006 |

OTHER PUBLICATIONS

Ruan et al., "Direct 3D Layer Metal Deposition", Sep. 10, 2008, pp. 333-341.

* cited by examiner

*Primary Examiner* — Samuel M Heinrich
(74) *Attorney, Agent, or Firm* — McDermott Will & Emery LLP

(57) ABSTRACT

A method for hybrid direct manufacturing is provided. The method involves depositing a foundation of material onto a substrate platform or base plate. The foundation serves as a foundation for a block of material (a monolith) to be welded thereon. Once the foundation is created, the monolith or block of material may be placed against the foundation. The foundation may be created such that its boundary matches with the boundary of the monolith that will be welded on top of the foundation. Next, the monolith is welded to the foundation using a high energy beam such as an electron beam. The method may also involve depositing a layer of material on or adjacent to the monolith.

25 Claims, 8 Drawing Sheets

METHOD AND SYSTEM FOR HYBRID DIRECT MANUFACTURING

STATEMENT REGARDING FEDERALLY SPONSORED RESEARCH OR DEVELOPMENT

This invention was made with Government support under Contract Number N00019-02-C-3002 awarded by The Department of the Navy. The Government has certain rights in this invention.

FIELD

The present invention generally relates to a direct manufacturing process and, more particularly, to a direct manufacturing process known as additive manufacturing using high energy beam welding technology.

BACKGROUND

The direct manufacturing (DM) process is a layer-additive manufacturing process that can quickly produce complex components by additively depositing layers of material using a high energy beam such as a laser or an electron beam The DM process offers many advantages over traditional fabrication methods such as forging of metallic parts. Particularly, the DM process can significantly reduce the manufacturing lead time by reducing setup and machining time while using substantially less raw materials. These advantages may also provide substantial cost reduction. Because of these advantages, the DM process is routinely used to rapidly produce prototypes and test components by the aerospace industry.

DM is now in transition for use in production articles for which the current industrial production capacity is insufficient. Since the DM process is an additive layering manufacturing process, the fabrication of parts having a large volume of material requires significant deposition machine capacity. Accordingly, what is needed is a method to further reduce the deposition time of large parts using new DM manufacturing processes.

SUMMARY OF THE INVENTION

The present disclosure provides a method for direct manufacturing that combines the direct manufacturing process with a welding process in order to create parts with large mass quickly and cost effectively. The process typically starts with a base plate, partial part or stage onto which material is deposited. In short, a foundation layer (or simply foundation) of material is deposited using a direct manufacturing process. Once the foundation layer is deposited, a monolith or block of material is welded to the foundation. In this way, parts with large volume may be created without having to perform a complete layer-by-layer deposit. Finally, once the monolith is joined to the base plate/part, additional layers of material may be deposited to create additional geometry. The additional layers of material may be deposited adjacent to the monolith, on the monolith, or between monoliths as needed.

The present disclosure provides a direct manufacturing process that can substantially reduce the build time of components having large volumes where another process is suitable to efficiently build subsets of the geometry. According to one aspect of the present disclosure, a method for direct manufacturing is provided. The method involves depositing a first foundation of material on a substrate such that a boundary or weld surface boundary of the first foundation substantially matches with a boundary of a first monolith. Once the first foundation is deposited, the method positions the first monolith against the first foundation and welds, using an energy beam, the first foundation and the first monolith together.

According to another aspect of the present disclosure, a process for direct manufacturing is provided. The process includes depositing first and second foundations of material on a substrate platform. The second foundation is deposited thicker than the first foundation. Next, monoliths are placed on top and welded to the first and second foundations using a high energy beam such as an electron beam.

According to yet another aspect of the present disclosure, a direct manufacturing system is provided. The system includes means for depositing a first foundation of material on a substrate platform such that a boundary of the first foundation substantially matches with a boundary of a first monolith. Means for depositing a second foundation of material on a substrate platform is also included. The system further includes means for placing the first and second monoliths against the first and second foundations. Finally, the system includes means for welding, using an energy beam, the first monolith to the first foundation and the second monolith to the second foundation.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute apart of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

Figure 1:
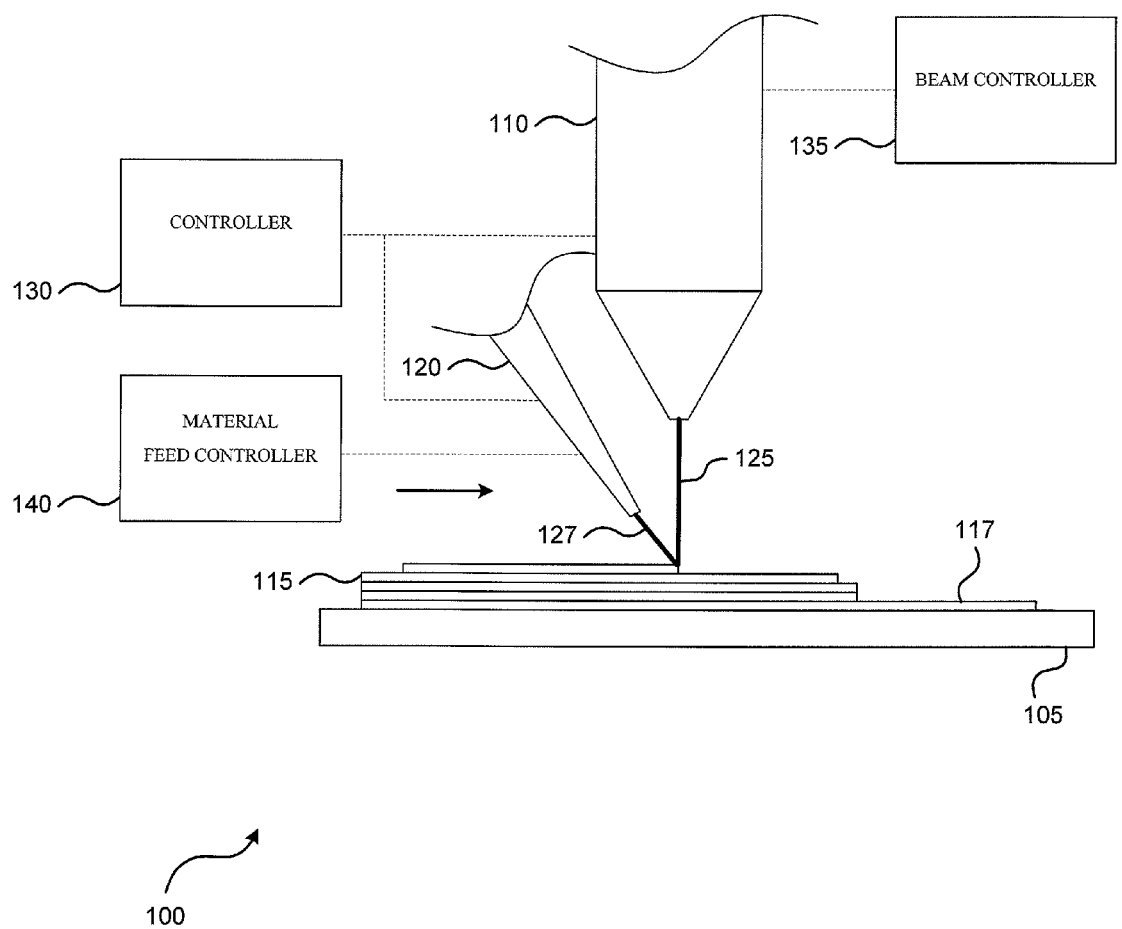
FIGS. 1-2 illustrate a direct manufacturing system according to one aspect of the present disclosure.

FIG. 1 illustrates a direct manufacturing system 100 according to one aspect of the subject disclosure. System 100 includes a base platform or bed 105, a high energy source 110, and a wire or material feeder 120. It should be noted that feeder 120 may feed material in the form of wire, powder or molten droplets. Bed 105 is the stage of system 100 and is mounted such that it can move in any direction along the x-y-z axes and rotate about one or more of the axes. The relative motion and rotation of bed 105 with respect to high energy source 110 may be controlled by a platform controller. In this way, the position of bed 105 can be changed relative to high energy beam 125. It should be noted that rather than moving bed 105, gun 110 and feeder 120 may be configured to move along the x-y-z axes and to rotate about one or more of the axes while bed 105 remains fixed. The relative motion and rotation of high energy source 110 and feeder 120 with respect to bed 105 may be controlled by a controller 130. Controller 130 may include a numerical control program and a motion control computer. The beam energy intensity and focus diameter may be adjusted by a beam controller 135. Wire feeder 120 is configured to feed a stock wire 127 to an exposure point on bed 105. The feed rate of the stock wire may be controlled by a material feed controller 140. Stock wire 127 may be a metal such as aluminum or titanium, a metal alloy, or other suitable materials.

In operation, system 100 deposits layers of material 115 onto a baseplate 117 one layer at a time. Baseplate 117 may be a preformed sheet of material that is securely attached to bed 105. Layers of material 115 are created by melting stock wire 127 using a high energy beam 125 at a focus point on baseplate 117. Stock wire 127 melts upon contact with the focused high energy beam 125. Once the molten material moves out of the focus point of beam 125, the molten material solidifies and bonds to the layer below as it cools. It should be noted that this entire process may be executed in a vacuum chamber. High energy source 110 may be a laser, an electron beam gun, or other energy beam generation equipment. In one embodiment, energy source 110 is an electron beam gun. Electron beam 125 may be electronically focusable. Additionally, the power output of beam 125 may range from several hundred watts to hundreds of kilowatts. This allows system 100 to deposit a very small amount of material to create thin walls or a very large amount of material (greater than 40 Lbs per hour).

Figure 2:
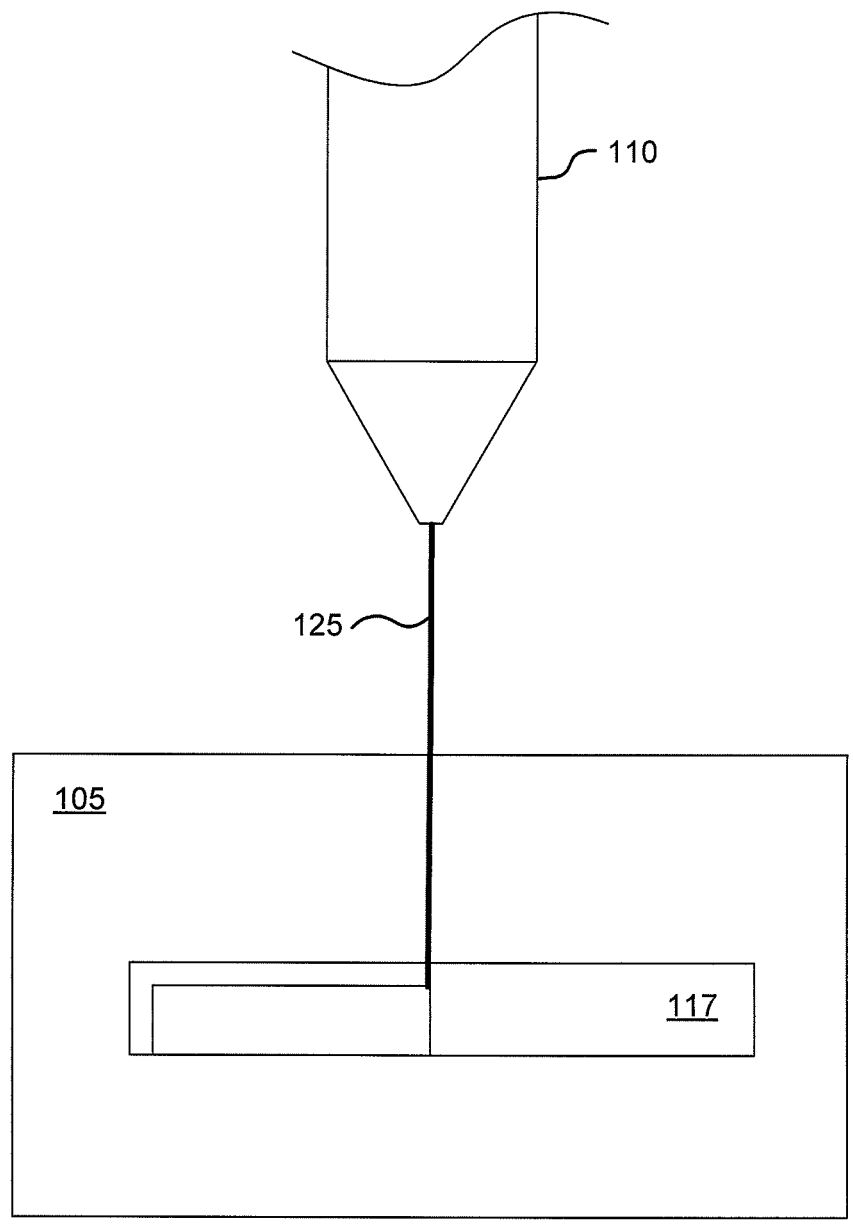

FIG. 2 illustrates system 100 with beam 125 being parallel to the main depositing surface of bed 105. This configuration may be achieved by rotating bed 105. Alternatively, high energy source 110 can be configured to rotate with respect to bed 105 such that beam 125 is parallel to the surface of bed 105. This parallel beam-to-platform configuration is useful in welding applications, which will be further described in detail below.

Figure 3:
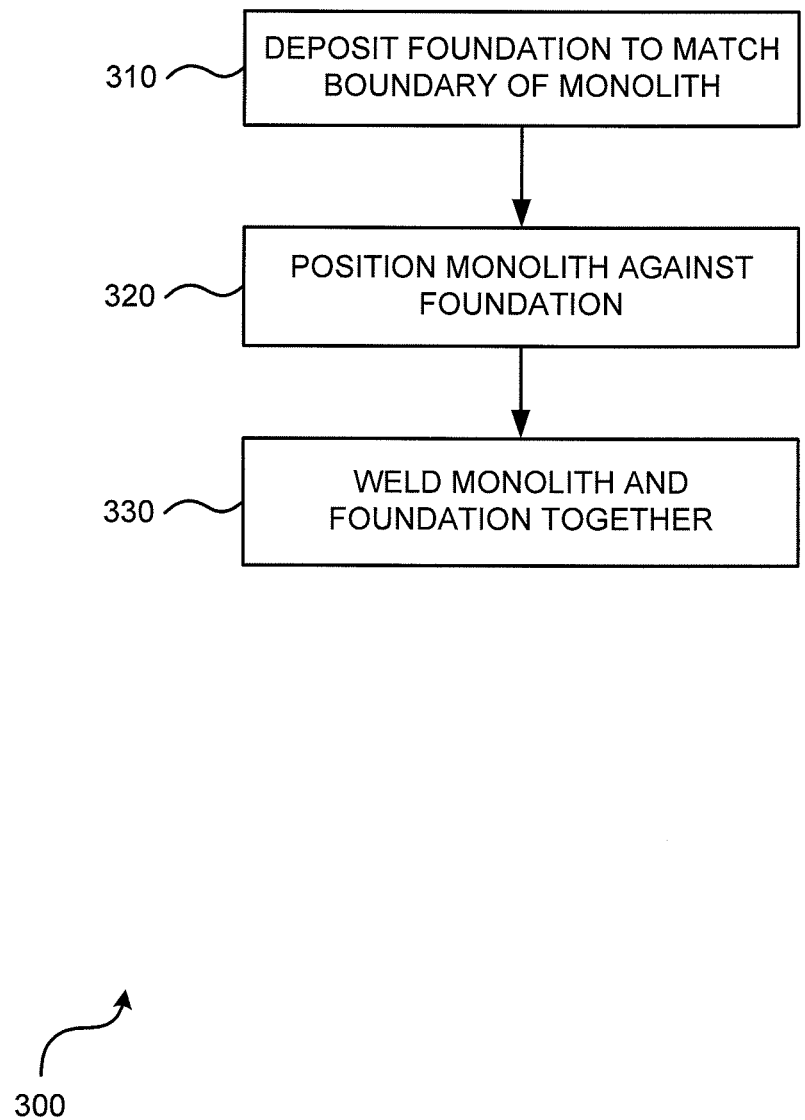
FIG. 3 illustrates a flow chart for a direct manufacturing process according to one aspect of the present disclosure.
Figure 4:
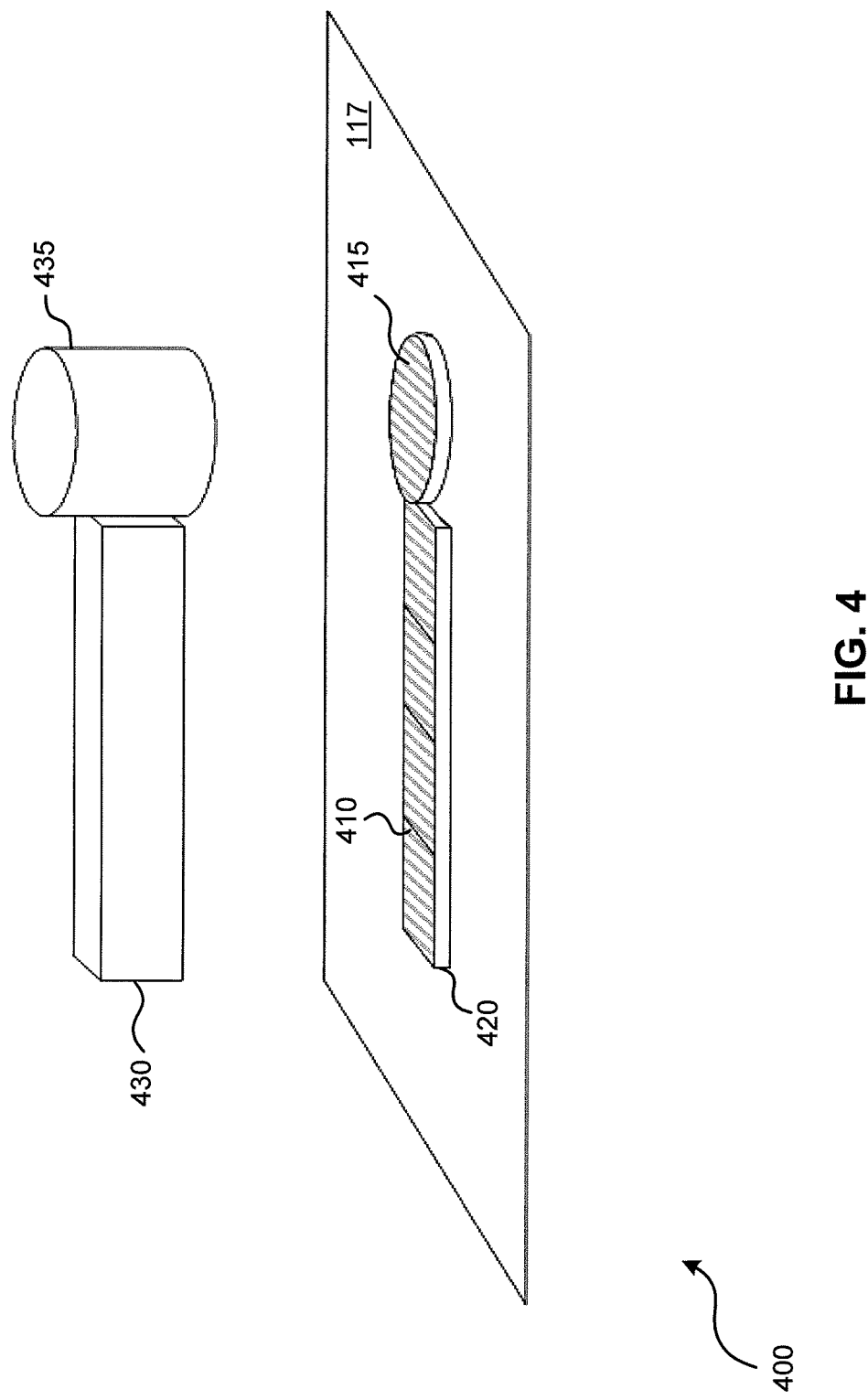
FIG. 4 illustrates a perspective view of raised foundations and monoliths according to one aspect of the present disclosure.

FIGS. 3 and 4 will now be described concurrently. FIG. 3 illustrates a flow chart of a hybrid direct manufacturing process 300 according to one embodiment of the present invention. FIG. 4 illustrates examples of raised foundations and monoliths used in process 300. Each of the monoliths can be made with the same material that makes feed wire 127. Alternatively, the monoliths may be comprised of a material that is different than the material of feed wire 127. Process 300 starts at step 310 where a foundation layer 410 (or simply a foundation) is deposited onto baseplate 117. Foundation 410 can be created to have a boundary that closely matches the bottom boundary of monolith 430. As shown in FIG. 4, the bottom surface of monolith 430 has a rectangular boundary, which substantially matches the boundary of foundation 410. Similarly, foundation 415 is created to have a circular boundary that matches the boundary of the bottom surface of monolith 435. The foundation may have a height 420, which may be, at a minimum, approximately half of the diameter of beam 125. In this way, when beam 125 strikes the mating or interface area where foundation 415 and monolith 430 meet, half of the beam diameter may be placed on foundation 415 and the other half may be placed on monolith 430, for example. Height 420 may also be selected arbitrarily. For example a height of at least ¼ inch may be selected. According to one aspect, an ablation process is performed to remove oxidation and other impurities on the surface of baseplate 117 prior to the layer deposition process of foundation 415. The ablation process may be implemented in vacuum using energy source 110.

In step 320, monoliths 430 and 435 are positioned against surfaces of foundations 410 and 415, respectively. This may be performed manually or automatically using a robotic arm. In one embodiment, the boundaries of foundations 410 and 415 may be machined to match details of the bottom boundaries of monoliths 430 and 435, respectively. In this way, the boundaries of the monolith and the foundations are flushed with each other when they are mated. Additionally, the top surface of each of the foundations may be face milled to create a planar mating surface. In this way the top surface of each of the foundations may be substantially planar or match with a planar mating surface of a respective monolith. This may be done to minimize the weld energy required, reduce the likeliness of air entrapment and provide consistent weld intensity along the joint.

Once monoliths 430 and 435 are positioned against their respective foundations, they are welded in place using energy beam 125. In some aspects, the energy beam operates in a vacuum or micro-vacuum chamber. To create the vacuum, the chamber must first be depressurized and to open the chamber, the chamber must be pressurized. Accordingly, opening the chamber during operation of the energy beam disrupts and delays the manufacturing process by requiring the chamber to be pressurized and then depressurized, which in some instances, may take more than two hours. In some aspects, the system 100 may be configured so that the monoliths are staged in the chamber and positioned against their respective foundations without disrupting the manufacturing process. In another aspect, the monoliths are positioned against their respective foundations by a robotic arm, motor, or actuator. In one aspect, the control of the robotic arm, motor, or actuator is performed by the same program that controls the energy source 110 and feeder 120. In some aspects, to provide proper welding contact, in one embodiment, beam 125 is configured to strike the welding area (i.e., the interface area of foundation 410 and monolith 430) perpendicularly with respect to the surface of the welding area. This helps create a solid weld joint since the heat from energy beam 125 is evenly distributed between the foundation and the monolith and reduces dispersion loss. It should be noted energy beam 125 may be oriented to strike the welding point at other angles.

Figure 5:
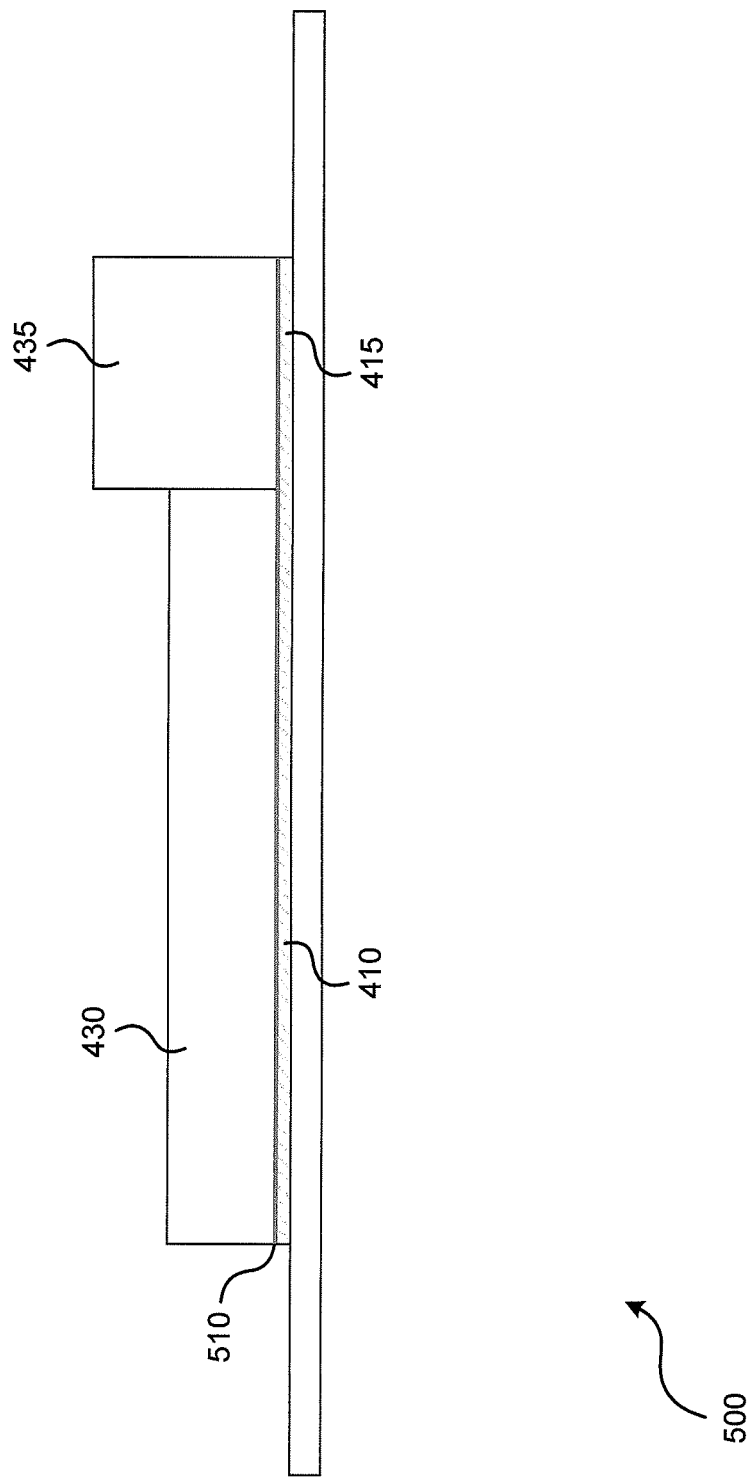
FIG. 5 illustrates a side view of monoliths welded onto their foundations according to one aspect of the present disclosure.

FIG. 5 illustrates a side-view of the welded components according to one aspect of the present disclosure. As shown in FIG. 5, monoliths 430 and 435 are welded to foundations 410 and 415 along a weld interface 510. In the welding process, a feed wire is not required. Monolith 430 and foundation 410 are fused together when materials around weld interface 510 melt and fuse together as they are struck by energy beam 125.

The energy intensity of beam 125 depends on the material composition of the foundation and the monolith to be welded.

Once monoliths 430 and 435 are welded to their respective foundations, the DM process may continue on to deposit additional layers on top of monoliths 430 and 435 to create additional geometries (not shown) and or details for the final component. This process is advantageous because monoliths 430 and 435 may be large in size and require a large amount of material. For example, monolith 430 may be very wide or tall, thus a lot of time can be saved by providing a prefabricated monolith and welding the monolith to the substrate rather than producing the monolith using only a direct manufacturing process. Monoliths 430 and 435 can be simple low cost stocks used to fill certain areas of the final component. This hybrid manufacturing process helps increase the efficiency of the process by eliminating the steps needed to form the monoliths using the DM process in full. Additionally, the above welding process may use the same high energy beam used by the DM process. Thus, new or additional equipment is not necessary. Further, by incorporating prefabricated stock into the DM process, large components can be made with quicker lead time and with lower cost than the traditional full DM deposition process or other processes. Flaws and other variability in the material properties (e.g., warping, void space, etc.) may also be reduced by using pre-fabricated blocks to avoid creating such blocks using a full DM deposition process.

Figure 6:
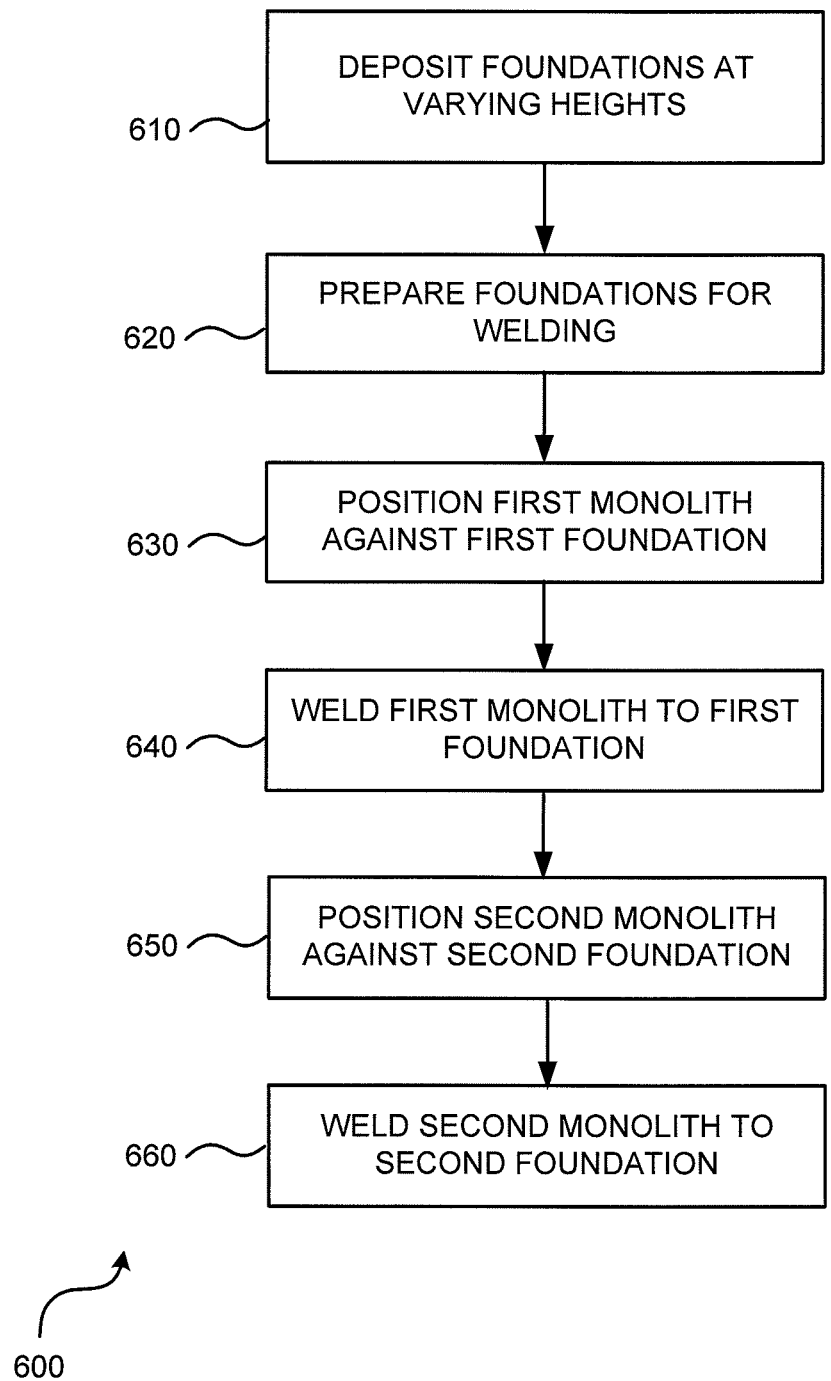
FIG. 6 illustrates a flow chart for direct manufacturing process according to one aspect of the present disclosure.
Figure 7:
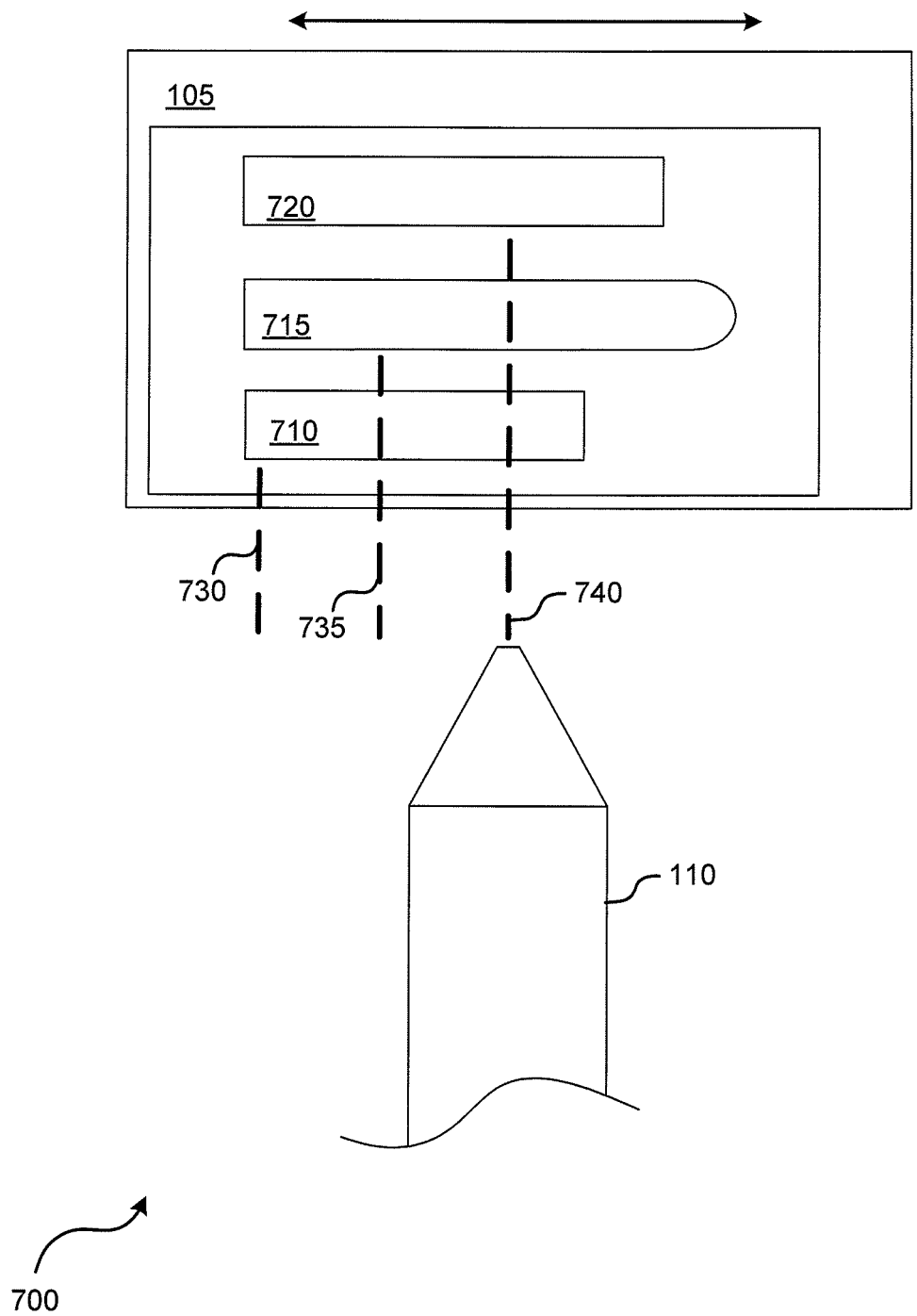
FIG. 7 illustrates a top view of a layout of a direct manufacturing system according to one aspect of the present disclosure.
Figure 8A:
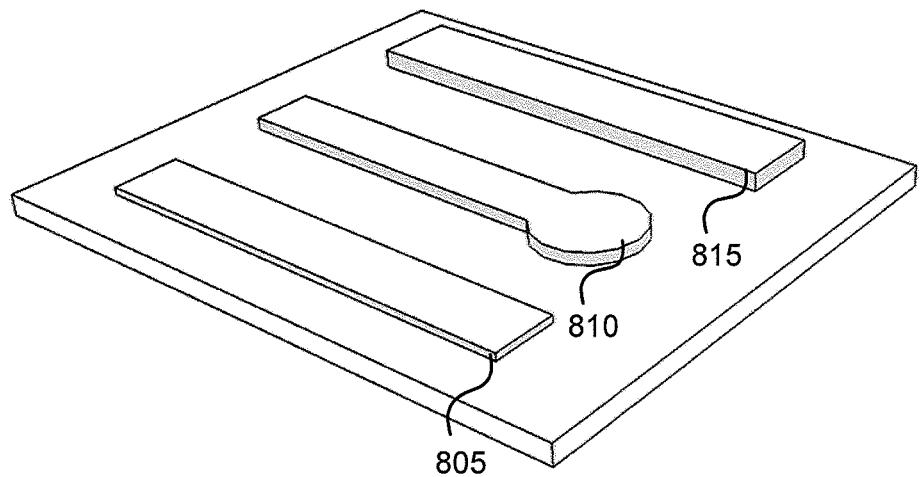
FIG. 8A illustrates a perspective views of raised foundations of varying heights according to one aspect of the present disclosure.
Figure 8B:
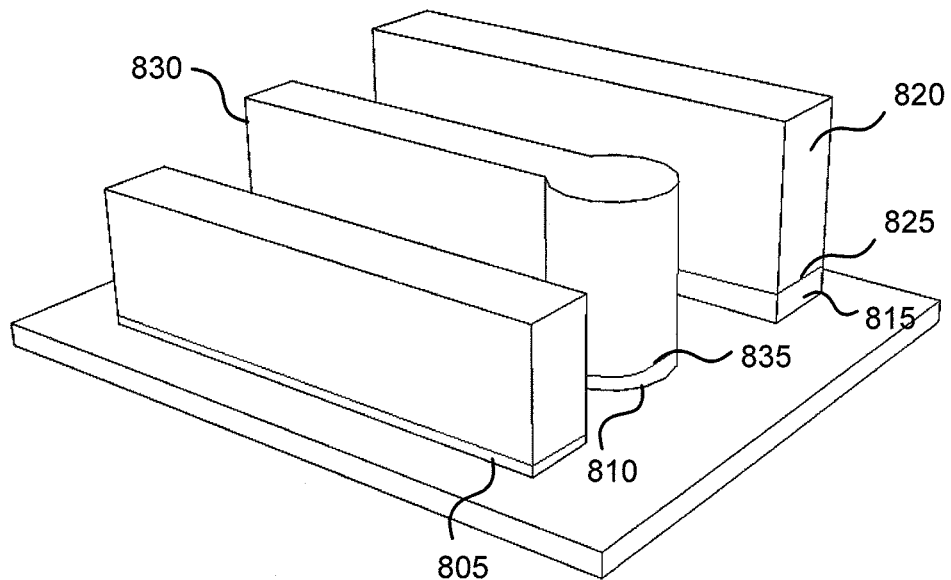
FIG. 8B illustrates a perspective views of the raised foundations of FIG. 8 being welded to their respective monolith according to one aspect of the present disclosure.

FIG. 6 illustrates a flow chart of a process 600 for hybrid direct manufacturing according to one aspect of the subject disclosure. For simplicity, FIGS. 7 and 8A-8B will be described concurrently with FIG. 6. FIG. 7 illustrates a top view of a DM system 700 according to one aspect of the subject disclosure. FIG. 8A illustrates a perspective view of foundations created using process 600, which will be described in detail below. FIG. 8B illustrates a perspective view of foundations being mated to their corresponding monolith.

Process 600 starts at step 610 where a plurality of foundations 710, 715, and 720 are deposited onto a substrate using DM system 700. Each of foundations 710, 715, and 720 has a different height with respect to each other. In one aspect of the present disclosure, foundation 720 is the highest foundation and foundation 710 is the shortest foundation. This arrangement allows beams 735 and 740 to reach the top area of foundations 715 and 720, respectively, unobstructed when the welding operation is performed. Beams 735 and 740 are both from high energy source 110 but with bed 105 at a different position with respect to high energy source 110. As shown in FIG. 7, the main work surface of bed 105 is parallel with the path of beams 735 and 740 of high energy source 110. This configuration may be achieved by translating and rotating either bed 105 or high energy source 110.

Referring now to FIG. 8A, each of the plurality of foundations may have a different height with respect to an adjacent foundation. In one aspect, the foundation closest to a point of origin (which may be a corner of bed 105 or the point of origin of the beam) has the lowest height, and the foundation farthest from the point of origin has the highest height. For example (referring to FIG. 8A), a foundation 805 is lower in height than a foundation 810, which is lower in height than a foundation 815. This foundation configuration makes it possible to weld multiple monoliths to a single substrate using an energy beam parallel to the main work surface of bed 105. In one aspect, the height differences between each of the foundations may be at least ½ of the diameter of energy beam 125. Alternatively, the beam may be configured to have ½ the height of the beam cross-sectional pattern. Because foundations 805 and 810 are both lower than foundation 815, the energy beam may strike the welding interface of foundation 815 and a monolith 820 (an interface is formed when foundation 815 and monolith 820 are mated against each other) without obstruction. For example, referring again to FIG. 7, a beam 740 from energy source 110 is able to reach foundation 720 because it is not obstructed by shorter foundations 710 and 715. In this illustration, foundation 720 is the tallest, foundation 715 is the second tallest, and foundation 710 is the shortest. Similarly, a beam 735 is able to reach the weld surface of foundation 715 because foundation 710 is shorter. Finally, beam 730 can unobstructively reach monolith 715 as it is the first foundation on the substrate from the beam source. Each of beams 730, 735, and 740 is from the high energy source 110 but with the bed 105 and/or gun 110 translated to different positions.

Referring again to FIG. 6, process 600 continues at step 620 where each of the foundations is prepared for welding. The preparation process may involve machining the boundary and surface of each of the foundations to match with the boundary of the monolith that will be welded thereon. Further, the preparation process may involve face milling the top surface of each of the foundations to improve surface-to-surface contact when a monolith is placed against or on top of the foundation. Additionally, indexing features or hardware may be employed to ensure that the monolith is positioned properly or to allow for the monolith to be lowered in place by, for example, triggering release of clamps by the NC program. Alternatively, the monolith may be lowered in place by robot, actuator or servo. Next, in step 630, a monolith is positioned against one of the foundations. In one embodiment, the first foundation to be welded to its monolith is the tallest. In this way, the horizontal energy beam can reach the welding point unobstructed. For example, referring to FIG. 8B, foundation 815 may be welded to its monolith first (step 640). Once the first monolith is welded, a second monolith is positioned against the next highest foundation for welding at steps 650 and 660. This process continues until all of the monoliths are welded to their respective foundations.

It should be noted that some variations to process 600 can be made. For example, foundation 810 can be made to be the tallest and be the first layer to be welded to its monolith. However, since layer 810 is taller than layer 815, the parallel energy beam (coming from the direction of layer 805) would not be able to reach the welding point at layer 815. This, however, can be overcome by rotating bed 105 by 180° degrees such that layer 815 becomes the closest layer to the beam's origin.

Referring now to FIG. 8B, each of the foundations 805, 810, and 815 have been welded to its respective monolith. As shown, weld interface 825 is higher than weld interface 835. This configuration allows the parallel energy beam to go over layers 805 and 810 unobstructed. As previously mentioned, the DM process may continue to layer additional material on any one of the monoliths or to join the monoliths to create the remainder of a final component. In this way, a full DM process is not used to create the entire component (avoiding the production of monoliths 820 and 830 using DM process), which can take a lot of time, and thereby increase the efficiency of the hybrid DM process 600.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method for hybrid direct manufacturing, the method comprising:
   depositing, using a direct manufacturing process, a first foundation of material on a substrate such that a boundary of the first foundation matches the boundary of a first monolith;
   positioning the first monolith against the first foundation; and
   welding, using an energy beam, the first foundation and the first monolith together;
   wherein a height of the first monolith is greater than a height of the first foundation.

2. The method of claim 1, wherein a height of the first foundation is at least half of a diameter of the energy beam.

3. The method of claim 1, further comprising depositing a second foundation on the substrate platform prior to the positioning of the first monolith, wherein the second foundation has a height that is different than a height of the first foundation, and wherein a boundary of the second foundation matches with the boundary of the second monolith.

4. The method of claim 3, wherein the second foundation is higher than the first foundation by at least half of the diameter of the energy beam.

5. The method of claim 3, further comprising:
   positioning a second monolith against the second foundation; and
   welding the second monolith to the second foundation.

6. The method of claim 1, further comprising face milling a top surface of the first foundation to match a mating surface of the first monolith.

7. The method of claim 1, further comprising machining the boundary of the first foundation to match with details of the boundary of the first monolith.

8. The method of claim 5, further comprising depositing a layer of material on the first or second monolith to create a component on top of the first or second monolith.

9. The method of claim 5, further comprising depositing a layer of material adjacent to the first or second monolith.

10. The method of claim 5, wherein the energy beam used to weld each of the monoliths to its respective foundation is parallel to a working surface of the substrate platform.

11. The method of claim 1, wherein the energy beam is an electron beam.

12. A method for hybrid direct manufacturing, the method comprising:
    depositing, using a direct manufacturing process, a first foundation of material on a substrate platform such that a boundary of the first foundation matches with a boundary of a first monolith;
    depositing a second foundation of material on a substrate platform such that a boundary of the second foundation matches with a boundary of a second monolith, wherein the second foundation is higher than the first foundation;
    placing the first and second monoliths against the first and second foundations, respectively; and
    welding, using an energy beam, the first monolith to the first foundation and the second monolith to the second foundation;
    wherein a height of the first monolith is greater than a height of the first foundation.

13. The method of claim 12, wherein the welding comprises creating a vacuum in a vacuum chamber, wherein the energy beam and the first and second monoliths are disposed inside the vacuum chamber, wherein the first and second monoliths are moved from a first position to a second position against the first and second foundations, respectively, without interrupting the vacuum in the vacuum chamber.

14. The method of claim 12, wherein a height of the first foundation is at least half of a diameter of the energy beam.

15. The method of claim 12, wherein the second foundation is higher than the first foundation by at least half of the diameter of the energy beam.

16. The method of claim 12, further comprising face milling surfaces of each of the first and second foundations.

17. The method of claim 12, further comprising machining the boundaries of the first and second foundations to match with details of the boundaries of the first and second monoliths.

18. The method of claim 12, further comprising depositing layers of material on the first or second monolith to create geometry on top of the first or second monolith or joining adjacent monoliths.

19. The method of claim 12, further comprising depositing layers of material adjacent to the first or second monolith to join the first or second monolith.

20. The method of claim 12, wherein the energy beam used to weld each of the monoliths to its respective foundation is parallel to the substrate platform.

21. The method of claim 12, wherein the energy beam is an electron beam.

22. A direct manufacturing system comprising:
- means for depositing a first foundation of material on a substrate platform such that a boundary of the first foundation matches with a boundary of a first monolith;
- means for depositing a second foundation of material on a substrate platform such that a boundary of the second foundation matches with a boundary of a second monolith, wherein the second foundation is higher than the first foundation;
- means for placing the first and second monoliths against the first and second foundations, respectively; and
- means for welding, using an energy beam, the first monolith to the first foundation and the second monolith to the second foundation;
- wherein a height of the first monolith is greater than a height of the first foundation.

23. The direct manufacturing system of claim 22, wherein a height of the first foundation is at least half of a diameter of the energy beam.

24. The direct manufacturing system of claim 22, wherein the second foundation is higher than the first foundation by at least half of the diameter of the energy beam.

25. The direct manufacturing system of claim 22, wherein the means for welding comprises creating a vacuum in a vacuum chamber, wherein the energy beam and the first and second monoliths are disposed inside the vacuum chamber, wherein the first and second monoliths are moved from a first position to a second position against the first and second foundations, respectively, without interrupting the vacuum in the vacuum chamber.

* * * * *